(12) United States Patent
Miyata et al.

(10) Patent No.: US 7,198,390 B2
(45) Date of Patent: Apr. 3, 2007

(54) REFLECTOR, PROJECTIVE DISPLAY AND PROJECTOR

(75) Inventors: Motoyuki Miyata, Hitachinaka (JP); Masahiko Yatsu, Fujisawa (JP); Hiroyuki Akata, Hitachi (JP); Masaharu Deguchi, Yokohama (JP); Katsuyuki Watanabe, Mito (JP); Takashi Naitou, Mito (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 10/920,351

(22) Filed: Aug. 18, 2004

(65) Prior Publication Data

US 2005/0047146 A1    Mar. 3, 2005

(30) Foreign Application Priority Data

Aug. 18, 2003  (JP) .............................. 2003-294228

(51) Int. Cl.
*F21V 5/00* (2006.01)
*F21V 7/22* (2006.01)

(52) U.S. Cl. ............. 362/331; 362/327; 362/310; 362/296; 428/426; 501/11; 501/64

(58) Field of Classification Search ............... 362/307, 362/310, 296, 341, 327, 331; 501/11, 62, 501/64; 428/428, 426
See application file for complete search history.

(56) References Cited

U.S. PATENT DOCUMENTS 5,039,631 A * 8/1991 Krashkevich et al. ......... 501/64

5,198,393 A    3/1993 Grebe
5,624,172 A    4/1997 Yamagishi
6,863,418 B2 * 3/2005 Masuoka et al. ........... 362/264

FOREIGN PATENT DOCUMENTS

| CN | 1097399 | 12/2002 |
|---|---|---|
| JP | A-58-64243 | 4/1983 |
| JP | 4348302 | 12/1992 |
| JP | B-92527 | 10/1995 |
| JP | A-11-102670 | 4/1999 |
| JP | 2001-249206 | 9/2001 |
| JP | 2002-109923 | 4/2002 |
| JP | A-2002-244199 | 8/2002 |
| WO | WO 02/047902 | 6/2002 |
| WO | WO 2004/083910 | 9/2004 |

* cited by examiner

*Primary Examiner*—Laura K. Tso
(74) *Attorney, Agent, or Firm*—Antonelli, Terry, Stout and Kraus, LLP.

(57) ABSTRACT

It is an object of the present invention to provide a reflector made of heat-resistant glass. It is another object of the present invention to provide a projective display which uses the reflector.

A projector device having: a light source emitting white light; a reflector reflecting a light emitted from the light source; a light valve modulating illumination beam of light; and a projective lens projecting image light from the light valve, wherein the reflector is made of a glass containing $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu, and the glass has a thermal expansion coefficient lower than $40 \times 10^{-7}/°$ C. and a transition temperature higher than 500° C.

12 Claims, 6 Drawing Sheets

REFLECTOR, PROJECTIVE DISPLAY AND PROJECTOR

FIELD OF THE INVENTION

The present invention relates to a reflector which reflects light fluxes (beam of light) emitted from a light source, a projective display and projector which can be widely used for back-projective TV sets and front-projective projectors.

BACKGROUND OF THE INVENTION

At present, projectors for business purposes have been widely spreading. Projective TV sets, which use a liquid-crystal display or the like, have been under development to replace conventional displays which project images displayed in a Braun tube onto a screen. A projective TV set, including a screen, needs a reflector of relatively large size, because (i) a projective TV set provides a relatively large space for devices, and (ii) a light source of long arc length (large light-emitting section) and reflector of long focal distance are frequently used to extend lamp life. On the other hand, it is particularly important to decrease size and weight of a projector for transportation. JP-A-2002-244199, for example, discloses a method for positioning a concave plane, which corrects light passing near the light axis of the light source to travel almost in parallel to the light axis, between an elliptic reflector and second focus.

Figure 7:
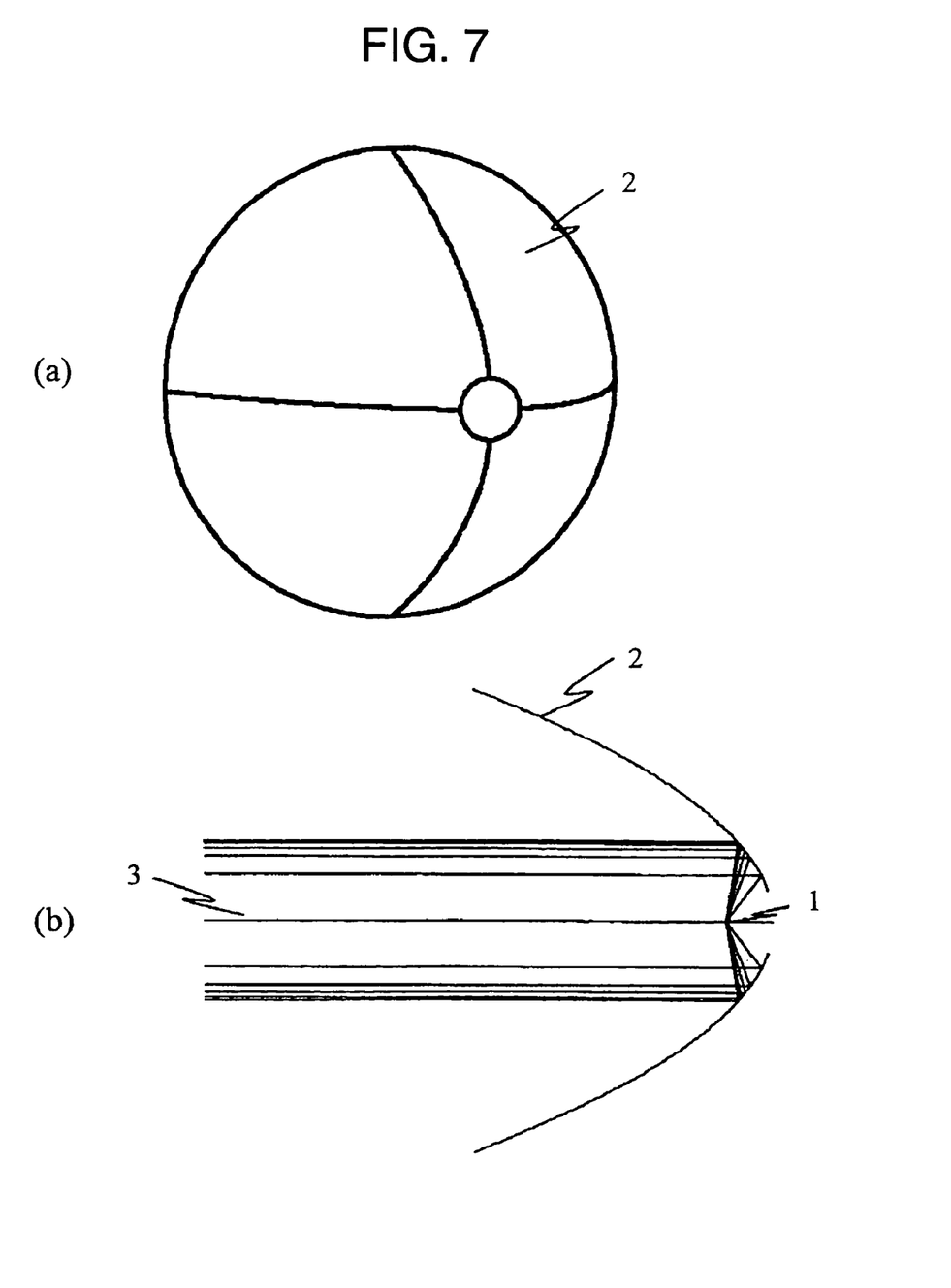
FIG. 7 illustrates a reflector.
Figure 8:
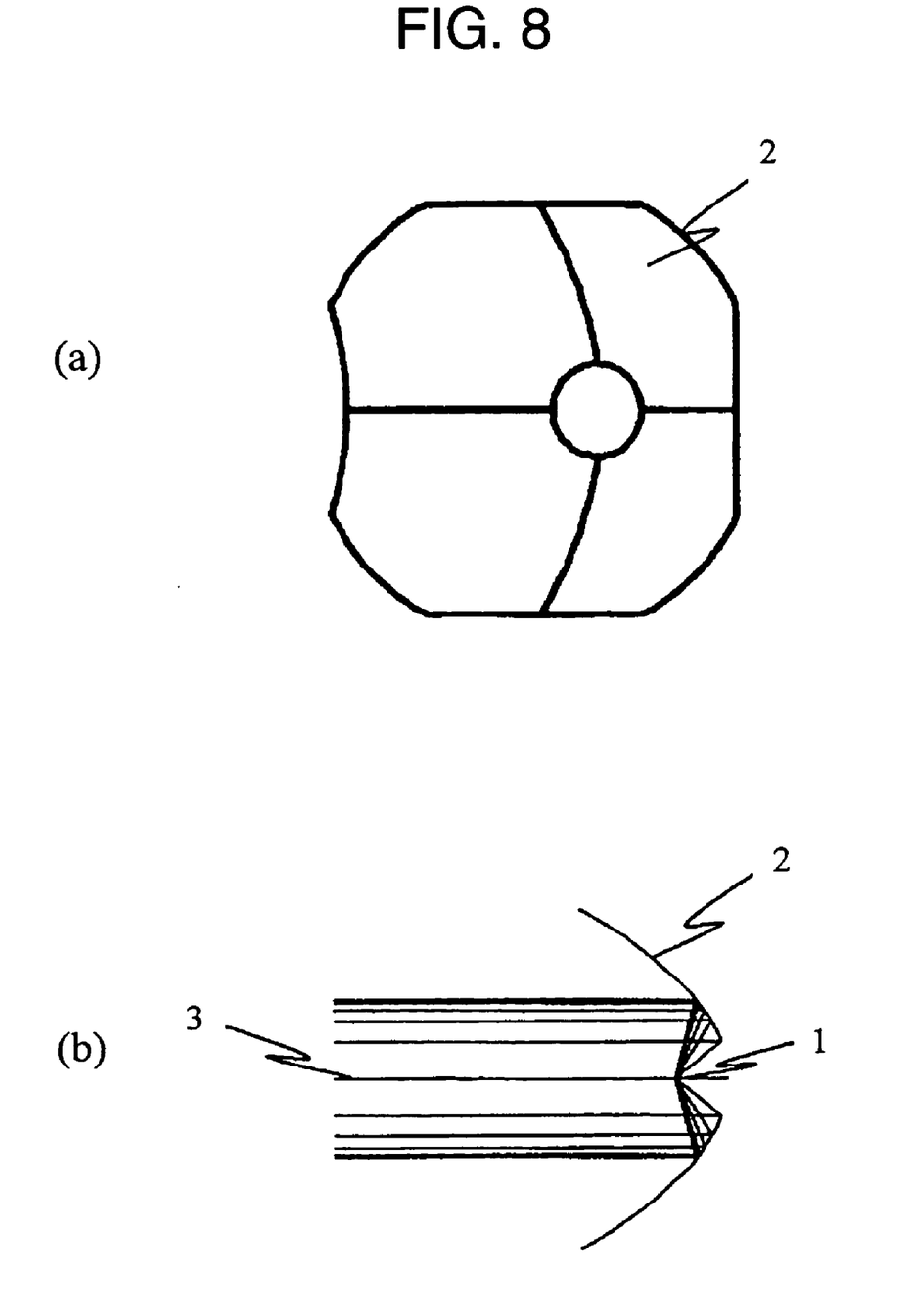
FIG. 8 illustrates a compact reflector.

How a reflector works is described by referring to FIGS. 7 and 8. FIG. 7 illustrates one example of reflector widely used for projective TV sets, where (a) is an oblique view, and (b) a cross-sectional view showing a plane which includes the light axis. FIG. 8 illustrates one example of small-size reflector widely used for projectors, where (a) is an oblique view, and (b) a cross-sectional view showing a plane which includes the light axis. The light beams are shown in each of the cross-sectional views. These figures illustrate the reflectors on the same scale to allow direct comparison between their sizes.

Referring to FIG. 7, the reflector comprises the light source 1, reflector 2 with a parabolic cross-section, and light axis 3. The light source is put into the parabolic reflector through a hole provided at the apex and positioned at the focus of the parabolic plane. The reflector 2 has a reflection plane rotationally symmetrical around the light axis 3. As a result, the light beams emitted from the light source 1 positioned at the focus of the parabolic plane of the reflector 2 are reflected by the parabolic plane to travel in parallel to the light axis. On the other hand, the small-size reflector 2 widely used for projectors, illustrated in the oblique view (a) in FIG. 2, the reflective plane is not rotationally symmetry around the light axis 3 passing through the light source 1, because the reflector peripheries are cut to decrease projector size. In addition to these physical arrangements, the reflector 2 is also devised to have a shortened focal distance to decrease its size.

Various reflector glass compositions have been proposed. JP-B-7-92527 discloses crystallized glass with a solid solution of β-spondumene or β-eucryptite as the major component, JP-A-2002-109923 crystallized glass with celsian as the major crystal phase, and JP-A-2001-249206 crystallized glass with β-quartz having a crystallite diameter of 400 nm or less as the major crystal.

SUMMARY OF THE INVENTION

As discussed above, decreasing focal distance of the reflector 2 is one of the methods to decrease projector size. This, however, increases temperature of the reflector 2 more as it comes closer to the light-emitting section of the light source 1. At present, the reflector 2 is air-cooled by a fan. It is technically possible to control temperature rise at the reflector 2 by increasing fan size to increase its cooling capacity. Increasing fan size, however, runs counter to decreasing projector size, weight and production cost, and, at the same time, aggravates noise problems. It is therefore necessary to decrease light valve or reflector size in order to decrease reflector size and weight without increasing fan size.

Moreover, it is necessary to crystallize crystal glass for a reflector after the reflector is formed into a shape, which should increase its production cost. Still more, a reflector is provided on its internal surface with a reflective layer which reflects light emitted from a light source. Formed crystal glass undergoes dimensional changes when the crystal phase separates out to produce irregularities on the surface, which needs an additional treatment for flattening. Still more, a reflector is exposed to changing heat while in service, which also produces irregularities on the surface as a result of difference in thermal expansion coefficient between the crystal and amorphous phases in the crystal glass. This may deteriorate characteristics of the reflective layer provided on the glass. Still more, further decreasing reflector size may be accompanied by uneven shape and distribution of the crystallites produced by the crystallization treatment to cause problems of deteriorated or fluctuated reflector strength.

It is an object of the present invention to provide a low-cost, high-quality reflector by solving the above problems.

A reflector comprises a parabolic main body holding a light source therein and a reflective layer provided on an internal surface of the main body. The main body for the reflector of the present invention is made of a glass which comprises $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu, and which has a thermal expansion coefficient lower than $40 \times 10^{-7}/°$ C. and a transition temperature higher than 500° C. More preferably, the glass has a thermal expansion coefficient lower than $35 \times 10^{-7}/°$ C. and a transition temperature higher than 600° C.

The glass for the present invention contains the rare-earth element at preferably 1 to 30% by weight as $Ln_2O_3$ (Ln: rare-earth element), more preferably 5 to 20% by weight. It also contains preferably at least $SiO_2$ at 45 to 75%, $B_2O_3$ at 0 to 20%, $Al_2O_3$ at 0 to 30%, $R_2O$ (R: alkali metal) at 0 to 10% and ReO (Re: alkaline earth metal) at 0 to 15%, more preferably $SiO_2$ at 50 to 70%, $B_2O_3$ at 5 to 15%, $Al_2O_3$ at 10 to 25%, $R_2O$ (R: alkali metal) at 0 to 5% and ReO (Re: alkaline earth metal) at 0 to 10%, all percents by weight.

The reflector of the present invention can decrease size and weight of the projective display, when used therefor, while improving its reliability. It can also decrease size and weight of the projector collecting beams from the light source in one direction, when used therefor. The glassy material for the present invention is also suitable for a light-transmitting plate to be positioned in front of a reflector.

The present invention provides a light, compact reflector of high resistance to heat. It can make the projective display and projector highly reliable, light and compact, when used therefor.

Other objects, features and advantages of the invention will become apparent from the following description of the embodiments of the invention taken in conjunction with the accompanying drawings.

DESCRIPTION OF THE REFERENCE NUMERALS AND SIGNS

| | |
|---|---|
| 1 | Light source |
| 2 | Reflector |
| 3 | Light axis |
| 4 | Multi-lens array |
| 4b | Light pipe |
| 5 | Polarized light converter |
| 6 | Focused lens |
| 7 | Dichroic mirror |
| 8 | Mirror |
| 9 | Field lens |
| 10 | Relay lens |
| 11 | Light valve |
| 12 | Cross prism |
| 13 | Projective lens |
| 14 | Color wheel |
| 15 | IR protection filter |
| 16 | UV protection filter |
| 17 | Main body |
| 18 | Reflective layer |
| 19 | Front plate |

DETAILED DESCRIPTION OF THE INVENTION

The embodiments of the present invention are described by referring to the drawings.

First, the glass composition for the present invention is described. Each glass composition for the present invention is produced by the following procedure. The starting powders, each in a given quantity, were mixed with each other in a platinum crucible, and molten at 1600° C. in an electrical oven. After they were sufficiently molten, the resulting melt was stirred by a stirring blade. The melt was put in a graphite mold kept at around 400° C., and treated to dissipate strain, to prepare the glass block, from which the specimen for each analysis was prepared.

The glass characteristics analyzed were bending strength, thermal expansion coefficient and transition temperature. Bending strength was determined by the 3-point bending test carried out in accordance with JIS R-1601 with the specimen, 3 mm by 4 mm by 35 mm in size, under a crosshead speed of 0.5 mm/minute and span of 30 mm. For thermal expansion coefficient and transition temperature, the specimen, 4 mm by 4 mm by 15 mm in size, was heated from room temperature at 5° C./minute.

The glass composition for the present invention can have an improved strength, when incorporated with a rare-earth element. Table 1 shows relationship between bending strength and an amount of a rare-earth element oxide added, where $Gd_2O_3$ was investigated for the effect of improving bending strength. In Table 1, units of each composition component and bending strength are % by weight and MPa.

TABLE 1

Amount of rare-earth element oxide added and characteristics

| No. | Formulations (wt %) | | | | | | | Bending strength (MPa) |
| | $SiO_2$ | $B_2O_3$ | $Al_2O_3$ | $Na_2O$ | $Li_2O$ | $K_2O$ | $Gd_2O_3$ | |
|---|---|---|---|---|---|---|---|---|
| 1 | 65 | 10 | 20 | 2.5 | 1.5 | 1 | 0 | 183 |
| 2 | 64.5 | 10 | 20 | 2.5 | 1.5 | 1 | 0.5 | 190 |
| 3 | 64 | 10 | 20 | 2.5 | 1.5 | 1 | 1 | 200 |
| 4 | 64 | 9 | 19 | 2.5 | 1.5 | 1 | 3 | 225 |
| 5 | 63 | 9 | 18 | 2.5 | 1.5 | 1 | 5 | 250 |
| 6 | 63 | 8 | 17 | 2.5 | 1.5 | 1 | 7 | 268 |
| 7 | 62 | 7 | 16 | 2.5 | 1.5 | 1 | 10 | 269 |
| 8 | 60 | 6 | 14 | 2.5 | 1.5 | 1 | 15 | 265 |
| 9 | 58 | 5 | 12 | 2.5 | 1.5 | 1 | 20 | 252 |
| 10 | 56 | 4 | 10 | 2.5 | 1.5 | 1 | 25 | 228 |
| 11 | 54 | 3 | 8 | 2.5 | 1.5 | 1 | 30 | 203 |
| 12 | 52 | 2 | 6 | 2.5 | 1.5 | 1 | 35 | 170 |

As shown in Table 1, the glass composition has an improved bending strength when incorporated with a rare-earth element oxide. It should be noted, however, that bending strength is not significantly improved at a $Gd_2O_3$ content below 1% by weight, and notably deteriorates as the content increases beyond 30% by weight. Therefore, it is preferably incorporated with a rare-earth element at 1 to 30% by weight as $Ln_2O_3$ (Ln: rare-earth element) based on the whole glass composition, more preferably 5 to 20% by weight.

Table 2 shows the relationship between kinds of rare-earth element oxide type characteristics of a glass composition, where No. 5 Composition shown in Table 1 served as the base which was incorporated with a varying rare-earth element oxide at 5% by weight.

TABLE 2

Kind of Rare-earth element oxide and characteristics

| No. | Kind of rare-earth element | Bending strength (MPa) |
|---|---|---|
| 13 | Sc | 205 |
| 14 | Y | 234 |
| 15 | La | 254 |
| 16 | Pr | 227 |
| 17 | Nd | 218 |
| 18 | Pm | 220 |
| 19 | Sm | 218 |
| 20 | Eu | 238 |
| 21 | Gd | 250 |
| 22 | Tb | 269 |
| 23 | Dy | 268 |
| 24 | Ho | 268 |
| 25 | Er | 270 |
| 26 | Tm | 267 |
| 27 | Yb | 271 |
| 28 | Lu | 269 |
| 29 | 1% La + 4% Gd | 258 |
| 30 | 2% Yb + 3% Pr | 252 |

TABLE 2-continued

Kind of Rare-earth element oxide and characteristics

| No. | Kind of rare-earth element | Bending strength (MPa) |
|---|---|---|
| 31 | 2% Gd + 1% Pr + 2% Yb | 253 |
| 32 | 1% La + 1% Er + 2% Lu + 1% Ho | 262 |

As shown in Table 2, each glass composition incorporated with a rare-earth element oxide has an improved bending strength over the one containing no rare-earth element oxide (No. 1 Composition shown in Table 1), particularly noted with the one incorporated with an oxide of rare-earth element selected from the group consisting of La, Gd, Tb, Dy, Ho, Er, Tm, Yb and Lu. Those incorporated with two or more different kinds of rare-earth element oxides (No. 29 to No. 32 Compositions) show a similarly improved bending strength.

Table 3 shows the relationship between formulations of constituent oxides of glass composition and glass characteristics, where units of composition component, transition temperature, thermal expansion coefficient and bending strength are % by weight, ° C., $10^{-7}$/° C. and MPa, respectively.

TABLE 3

Constituent oxides and characteristics

| | Formulation (wt %) | | | | | | | | | | Characteristics | | |
|---|---|---|---|---|---|---|---|---|---|---|---|---|---|
| No. | $SiO_2$ | $B_2O_3$ | $Al_2O_3$ | $Na_2O$ | $Li_2O$ | $K_2O$ | MgO | CaO | ZnO | $Gd_2O_3$ | Transition temperature (° C.) | Thermal expansion coefficient ($\times 10^{-7}$/° C.) | Bending strength (MPa) |
| 33 | 40 | 19 | 28 | 2.7 | 1.5 | 0.8 | 3 | 0 | 0 | 5 | 473 | 47 | 153 |
| 34 | 43 | 17 | 27 | 2.7 | 1.5 | 0.8 | 3 | 0 | 0 | 5 | 487 | 43 | 175 |
| 35 | 45 | 17 | 25 | 2.7 | 1.5 | 0.8 | 3 | 0 | 0 | 5 | 508 | 40 | 208 |
| 36 | 47 | 17 | 23 | 2.7 | 1.5 | 0.8 | 3 | 0 | 0 | 5 | 516 | 38 | 228 |
| 37 | 50 | 17 | 20 | 2.7 | 1.5 | 0.8 | 3 | 0 | 0 | 5 | 524 | 35 | 252 |
| 38 | 60 | 11 | 16 | 2.7 | 1.5 | 0.8 | 3 | 0 | 0 | 5 | 568 | 33 | 278 |
| 39 | 67 | 8 | 12 | 2.7 | 1.5 | 0.8 | 3 | 0 | 0 | 5 | 582 | 31 | 264 |
| 40 | 70 | 7 | 10 | 2.7 | 1.5 | 0.8 | 3 | 0 | 0 | 5 | 608 | 35 | 253 |
| 41 | 73 | 5 | 9 | 2.7 | 1.5 | 0.8 | 3 | 0 | 0 | 5 | 622 | 28 | 233 |
| 42 | 75 | 5 | 7 | 2.7 | 1.5 | 0.8 | 3 | 0 | 0 | 5 | 635 | 25 | 209 |
| 43 | 77 | 3 | 7 | 2.7 | 1.5 | 0.8 | 3 | 0 | 0 | 5 | 648 | 23 | 187 |
| 44 | 69 | 0 | 17 | 3.5 | 2 | 0.5 | 1 | 0 | 2 | 5 | 612 | 32 | 208 |
| 45 | 67 | 3 | 16 | 3.5 | 2 | 0.5 | 1 | 0 | 2 | 5 | 608 | 33 | 234 |
| 46 | 66 | 5 | 15 | 3.5 | 2 | 0.5 | 1 | 0 | 2 | 5 | 604 | 34 | 252 |
| 47 | 62 | 10 | 14 | 3.5 | 2 | 0.5 | 1 | 0 | 2 | 5 | 584 | 36 | 268 |
| 48 | 58 | 15 | 13 | 3.5 | 2 | 0.5 | 1 | 0 | 2 | 5 | 558 | 38 | 253 |
| 49 | 57 | 17 | 12 | 3.5 | 2 | 0.5 | 1 | 0 | 2 | 5 | 526 | 39 | 233 |
| 50 | 55 | 20 | 11 | 3.5 | 2 | 0.5 | 1 | 0 | 2 | 5 | 505 | 40 | 208 |
| 51 | 52 | 23 | 11 | 3.5 | 2 | 0.5 | 1 | 0 | 2 | 5 | 486 | 42 | 184 |
| 52 | 51 | 25 | 10 | 3.5 | 2 | 0.5 | 1 | 0 | 2 | 5 | 473 | 43 | 158 |
| 53 | 69 | 18 | 0 | 2 | 2 | 1 | 2 | 2 | 1 | 3 | 476 | 32 | 172 |
| 54 | 67 | 17 | 3 | 2 | 2 | 1 | 2 | 2 | 1 | 3 | 487 | 33 | 193 |
| 55 | 67 | 16 | 5 | 2 | 2 | 1 | 2 | 1 | 1 | 3 | 503 | 33 | 218 |
| 56 | 66 | 15 | 7 | 2 | 2 | 1 | 2 | 1 | 1 | 3 | 538 | 34 | 237 |
| 57 | 64 | 14 | 10 | 2 | 2 | 1 | 2 | 1 | 1 | 3 | 552 | 34 | 256 |
| 58 | 60 | 13 | 15 | 2 | 2 | 1 | 2 | 1 | 1 | 3 | 573 | 35 | 266 |
| 59 | 58 | 10 | 20 | 2 | 2 | 1 | 2 | 1 | 1 | 3 | 587 | 37 | 278 |
| 60 | 56 | 9 | 23 | 2 | 2 | 1 | 2 | 1 | 1 | 3 | 598 | 38 | 261 |
| 61 | 55 | 8 | 25 | 2 | 2 | 1 | 2 | 1 | 1 | 3 | 607 | 38 | 254 |
| 62 | 54 | 7 | 27 | 2 | 2 | 1 | 2 | 1 | 1 | 3 | 612 | 39 | 237 |
| 63 | 52 | 6 | 30 | 2 | 2 | 1 | 2 | 1 | 1 | 3 | 623 | 40 | 204 |
| 64 | 51 | 4 | 33 | 2 | 2 | 1 | 2 | 1 | 1 | 3 | 627 | 43 | 176 |
| 65 | 50 | 3 | 35 | 2 | 2 | 1 | 2 | 1 | 1 | 3 | — | — | — |
| 66 | 60 | 13 | 18 | 0 | 0 | 0 | 3 | 0 | 0 | 6 | 668 | 28 | 298 |
| 67 | 60 | 12 | 16 | 1.6 | 0.9 | 0.5 | 3 | 0 | 0 | 6 | 636 | 30 | 283 |
| 68 | 60 | 11 | 15 | 2.7 | 1.5 | 0.8 | 3 | 0 | 0 | 6 | 604 | 33 | 271 |
| 69 | 60 | 10 | 14 | 3.8 | 2.1 | 1.1 | 3 | 0 | 0 | 6 | 548 | 34 | 261 |
| 70 | 60 | 9 | 12 | 5.4 | 3 | 1.6 | 3 | 0 | 0 | 6 | 508 | 40 | 254 |
| 71 | 60 | 8 | 10 | 7 | 4 | 2 | 3 | 0 | 0 | 6 | 486 | 45 | 248 |
| 72 | 60 | 7 | 9 | 8.1 | 4.5 | 2.4 | 3 | 0 | 0 | 6 | 465 | 53 | 236 |
| 73 | 62 | 13 | 17 | 2 | 1 | 0 | 0 | 0 | 0 | 5 | 620 | 31 | 298 |
| 74 | 61 | 13 | 15 | 2 | 1 | 0 | 3 | 0 | 0 | 5 | 612 | 32 | 260 |
| 75 | 60 | 12 | 15 | 2 | 1 | 0 | 5 | 0 | 0 | 5 | 607 | 33 | 258 |
| 76 | 58 | 12 | 15 | 2 | 1 | 0 | 7 | 0 | 0 | 5 | 583 | 34 | 254 |
| 77 | 56 | 11 | 15 | 2 | 1 | 0 | 10 | 0 | 0 | 5 | 566 | 35 | 252 |
| 78 | 55 | 10 | 14 | 2 | 1 | 0 | 13 | 0 | 0 | 5 | 523 | 38 | 228 |
| 79 | 54 | 9 | 14 | 2 | 1 | 0 | 15 | 0 | 0 | 5 | 505 | 40 | 207 |
| 80 | 53 | 7 | 15 | 2 | 1 | 0 | 17 | 0 | 0 | 5 | 485 | 43 | 189 |
| 81 | 52 | 5 | 15 | 2 | 1 | 0 | 20 | 0 | 0 | 5 | 463 | 45 | 175 |

As shown in Table 3, the glass composition tends to have a thermal expansion coefficient decreasing and transition temperature increasing as $SiO_2$ content increases (No. 33 to No. 43 Compositions). However, $SiO_2$ content beyond a range of 45 to 75% by weight is not desirable: the composition is not sufficiently vitrified at less than 45% and decreases in solubility to cause striae excessively at more than 75%. Therefore, it is incorporated with $SiO_2$ at preferably 45 to 75% by weight, inclusive, more preferably 50 to 70%.

Table 3 also shows the relationship between $B_2O_3$ content and glass characteristics (No. 44 to No. 52 compositions). Incorporation of $B_2O_3$ results in a glass composition having an improved fluidity. However, the effects of a rare-earth element for improving mechanical properties tend to diminish as $B_2O_3$ content increases beyond 20% by weight. Therefore, $B_2O_3$ content is preferably 20% by weight or less, more preferably 5 to 15% by weight.

Table 3 also shows the relationship between $Al_2O_3$ content and glass characteristics (No. 53 to No. 65 compositions). Incorporation of $Al_2O_3$ improves bending strength. However, increasing $Al_2O_3$ content beyond 30% by weight is not desirable, because of increased glass melting point to leave the unmolten part in the composition. Therefore, $Al_2O_3$ content is preferably 30% by weight or less, more preferably 10 to 25% by weight.

Table 3 also shows the relationship between alkali content ($Na_2O$, $Li_2O$ and $K_2O$ totaled) and glass characteristics (No. 66 to No. 72 compositions). As shown, increasing alkali content increases thermal expansion coefficient and decreases transition temperature. Therefore, alkali content is preferably 10% by weight or less, more preferably 5% by weight or less.

Table 3 also shows the relationship between alkaline earth element oxide content and glass characteristics (No. 73 to No. 81 compositions). As shown, increasing alkaline earth element oxide content increases thermal expansion coefficient and decreases transition temperature. Therefore, alkaline earth element oxide content is preferably 15% by weight or less, more preferably 10% by weight or less.

Table 4 shows the relationship between ratio of $Li_2O/Na_2O$ selected from the alkali oxides incorporated and glass characteristics (No. 82 to No. 96 compositions), where No. 6 Composition shown in Table 1 served as the base which was incorporated with alkali element oxides at a constant content of 5% by weight but varying $Li_2O/Na_2O$ ratio.

TABLE 4

$Li_2O/Na_2O$ ratio and chracteristics

| No. | $Li_2O/Na_2O$ ratio | Transition temperature (° C.) | Thermal expansion coefficient ($\times 10^{-7}$/° C.) | Bending strength (Mpa) |
|---|---|---|---|---|
| 82 | 0.1 | 635 | 32 | 187 |
| 83 | 0.3 | 632 | 32 | 203 |
| 84 | 0.5 | 624 | 33 | 234 |
| 85 | 0.6 | 532 | 33 | 268 |
| 86 | 0.7 | 528 | 34 | 275 |
| 87 | 1 | 525 | 34 | 281 |
| 88 | 1.5 | 523 | 35 | 293 |
| 89 | 2 | 520 | 36 | 310 |
| 90 | 3 | 517 | 37 | 324 |
| 91 | 5 | 511 | 38 | 289 |
| 92 | 7 | 508 | 40 | 253 |
| 93 | 9 | 485 | 41 | 232 |
| 94 | 11 | 462 | 43 | 178 |
| 95 | 13 | 454 | 44 | 164 |
| 96 | 15 | 438 | 45 | 153 |

As shown in Table 4, bending strength increases as $Li_2O/Na_2O$ ratio increases, attaining a maximum at the ratio of around 3 (No. 90). On the other hand, transition temperature decreases while thermal expansion coefficient increases as the ratio increases. Therefore, $Li_2O/Na_2O$ ratio is preferably in the range from 0.3 to 7.

Figure 1:
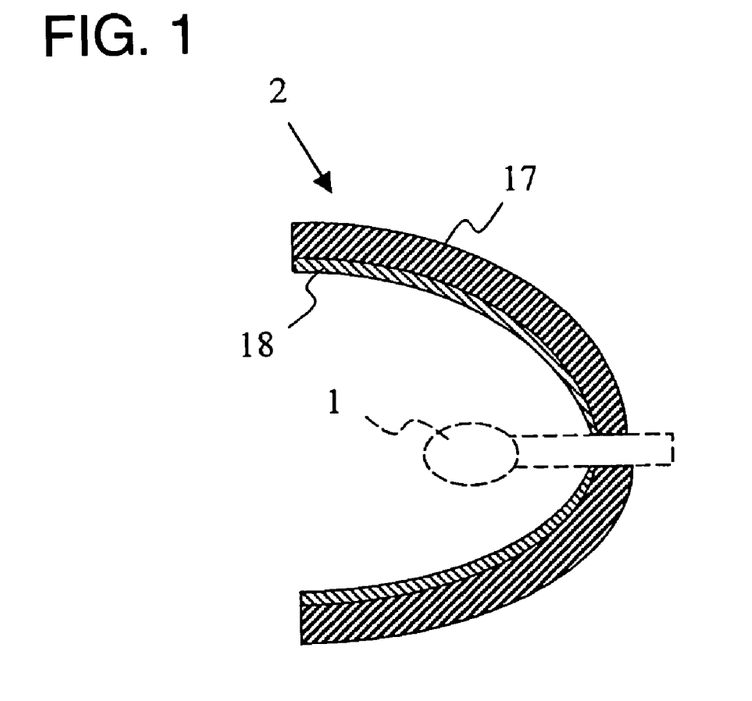
FIG. 1 is a skeletal cross-sectional view of the reflector of the present invention with a parabolic surface.

Each of the glass compositions for the present invention was formed into a reflector shape by pressing in a mold, to evaluate its characteristics. It was a reflector for a projective display working at a light source output of 200W. FIG. 1 is a skeletal cross-sectional view of the reflector of the present invention with a parabolic surface. The reflector 2 comprises the parabolic body 17 of a glass material (glass composition), coated with the reflective layer 18 on the internal surface. The reflector 2 of this embodiment has a parabolic internal surface with the light source 1 positioned at the focus. The reflective layer 18 is required to be heat-resistant, and is made of an inorganic material, e.g., metal. It is a laminate of materials of different refractive index to secure reflection selectivity. More specifically, the laminate is composed of alternately placed $SiO_2$ and $Ta_2O_5$ layers, where $Ta_2O_5$ may be replaced by $Nb_2O_5$ or the like.

The glass material for the reflector of the present invention preferably has a thermal expansion coefficient of less than $40 \times 10^{-7}$/° C. or less. The thermal expansion coefficient above $40 \times 10^{-7}$/° C. may damage the glass material by cracking or the like, because of temperature difference of around 400° C. generated when the reflector is repeatedly switched on and off. The thermal expansion coefficient of less than $35 \times 10^{-7}$/° C. is more preferable, because the reflector shape can be made compacter for the same light source output.

The glass material for the reflector of the present invention preferably has a transition temperature of 500° C. or higher. The transition temperature below 500° C. may cause deformation or damage of the reflector, because the reflector is heated to around 400° C. while it is switched on, or beyond heat resistant temperature of the reflector. The transition temperature of 600° C. or higher is more preferable, because the reflector shape can be made compacter for the same light source output.

The glass material for the reflector of the present invention preferably has a bending strength of 200 MPa or more, determined by the 3-point bending test carried out in accordance with JIS R-1601. The bending strength below 200 MPa may crack and damage the reflector, due to a stress produced in the glass resulting from temperature difference of around 400° C. generated when the reflector is repeatedly switched on and off. The bending strength of 250 MPa or more is more preferable, because the reflector shape can be made compacter for the same light source output.

The reflector of the present invention can be compacter and thinner when it is used for a projective display comprising a light source emitting white light, reflector reflecting beams emitted from the light source, light valve modulating illumination beam of light and projective lens projecting image light from the light valve. The reflector of the present invention can be at least 30 wt % lighter than a reflector composed of a conventional glass material, leading to reduced weight and production cost of the display. At the same time, it is thinner and stronger to have improved thermal shock characteristics while it is repeatedly switched on and off.

Figure 2:
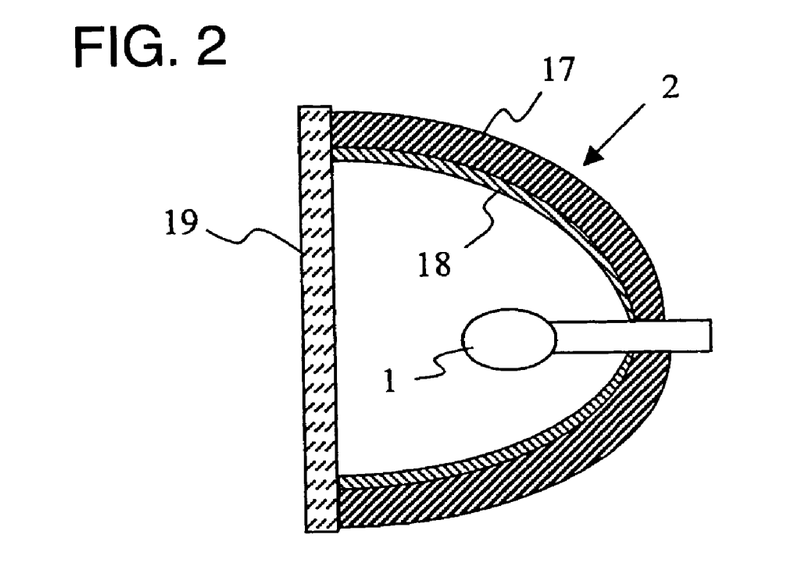
FIG. 2 structurally illustrates the projector of the present invention.

The present invention is also applicable to projectors for illumination. FIG. 2 is a skeletal cross-sectional view of the projector of the present invention. This projector comprises the light source 1, reflector 2 reflecting light beams emitted from the light source 1, and front plate 19 transmitting the light beams emitted from the light source 1 and those reflected by the reflector 2. The reflector 2 comprises the main body 17 of a glass material, coated with the reflective layer 18 on the internal surface, basically similar to the one shown in FIG. 1. It is possible also for the projector to be lighter by at least 30% and thinner, thickness being halved at least at the front plate, by use of the glass material for the present invention for the reflector body 17 and front plate 19, which makes the reflector compactor and thinner, leading to the reduced weight and production cost of the projector. In particular, for an optical member which transmits light, e.g., front plate, a rare-earth element to be incorporated in the glass material is preferably the one having no absorption edge in the visible wavelength range, e.g., Y, La, Gd or Lu. Such a projector is applicable to illuminators for moving objects, e.g., vehicles and trains, and stationary illuminators in addition to projective displays.

The glass material for the present invention is highly resistant to heat, as described above. The reflector, light pipe and color wheel composed of the glass materials are described.

Figure 3:
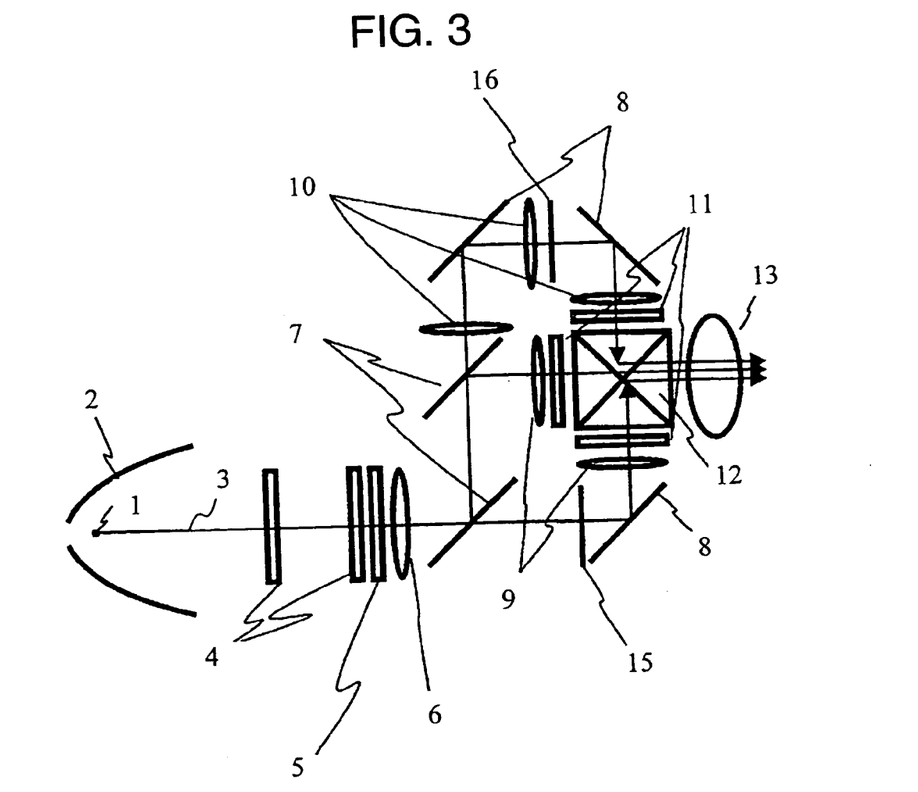
FIG. 3 illustrates the essential structure of one embodiment of the projective display of the present invention with the reflector of the present invention.

FIG. 3 illustrates the essential structure of one embodiment of the projective display of the present invention. It comprises the light source 1, reflector 2, multi-lens array 4, polarized light converter 5, focused lens 6, dichroic mirror 7, mirror 8, field lens 9, relay lens 10, light valve 11, cross prism 12, projective lens 13, IR protection filter 15 and UV protection filter 16. The reflector 2 has a parabolic structure, as illustrated in FIG. 1. It is made of glass which is composed of $SiO_2$ as the major ingredient and at least one rare-earth element selected from the group consisting of Sc, Y, La, Pr, Nd, Pm, Sm, Eu, Gd, Tb, Dy, Ho, Er, Tm, Yb and Lu, and is coated with a reflective layer. The light beams emitted from the focal point of the reflector 2 are reflected by the reflective surface of the reflector 2 to travel in parallel to the light axis 3. However, the light source 1 is not a point source, with the result that the light beams emitted from the light source 1 positioned at the focal point in the reflector 2 have a distribution centered by those traveling in parallel to the light axis 3, when leave the reflector 2 after being reflected by its parabolic reflective surface. The beams are then improved in brightness uniformity by the multi-lens array 4.

Light intensity of the beams leaving the reflector 2 is distributed in a cross-section perpendicular to the light axis to make the center darker, due to the hole bored in the reflector 2 for passing a valve. In addition, the distribution also makes the exterior darker due to the light distribution (energy angle distribution) and solid angle enveloped by the reflector 2. This embodiment employs an integrator with 2 multi-lens arrays 4 having convex lenses arranged two-dimensionally. It divides beams of uneven intensity distribution into a plurality of regions by the convex lenses in the first multi-lens array 4 and collects light by the corresponding convex lenses in the second multi-lens array 4. The divided beams are then combined on the light valve 11 surface by the focused lens 6, to make the distribution more even. The polarized light converter 5 is provided at the point at which the beams are collected downstream of the second multi-lens array 4, to convert natural light into one type of linearly polarized light, because a liquid crystal commonly used for the downstream light valve 11 has a transmission axis to selectively transmit a specific type of linearly polarized light. The polarized light converter 5 can be dispensed with when each pixel for the light valve 11 is composed of a mirror.

The dichromic mirrors 7, mirrors 8 and field lenses 9 are provided in the light path between the focused lens 6 and light valves 11, where the mirrors 7 divide white light into red, green and blue colors in this order, mirrors 8 deflect the light path, and lenses 9 make the light beams telecentric. The red, green and blue beams modulated by the corresponding light valve 11 of transmission type are synthesized by the cross prism 12, and then projected by the projective lens 13 onto a screen or the like. In this system, which uses the cross prism 12, light path length is different color by color. Therefore, the relay lens 10 is provided in the long light path for each color, to map the light intensity on the light valve 11 surface.

The red, green and blue colors are separated in the following manner. Referring to FIG. 3, the first dichroic mirror 7 transmits the red beams while reflecting the green and blue beams, and the second dichroic mirror 7 transmits the blue beams while reflecting the green beams. The IR protection filter 15 is provided in the light path for the red beams, to prevent temperature rise at the light valve 11 by IR ray. At the same time, the UV protection filter 16 is provided in the light path for the blue beams, to prevent degradation of the organic materials by UV ray. The light valve 11 shown in FIG. 3 is of liquid-crystal type, which has a transmission axis to selectively transmit a specific type of linearly polarized light. Therefore, a phase difference plate as a polarizer is provided in each of the light inlet and outlet sides around the light valve 11 to improve its contrast performance.

The present invention can realize the compact reflector 2 by use of a heat-resistant glass material. However, decreasing size of the reflector 2 is accompanied by accumulation of heat inside, which, in turn, causes temperature rise of the bulb holding the light source 1. Therefore, the bulb is cooled by directly supplied air.

Figure 4:
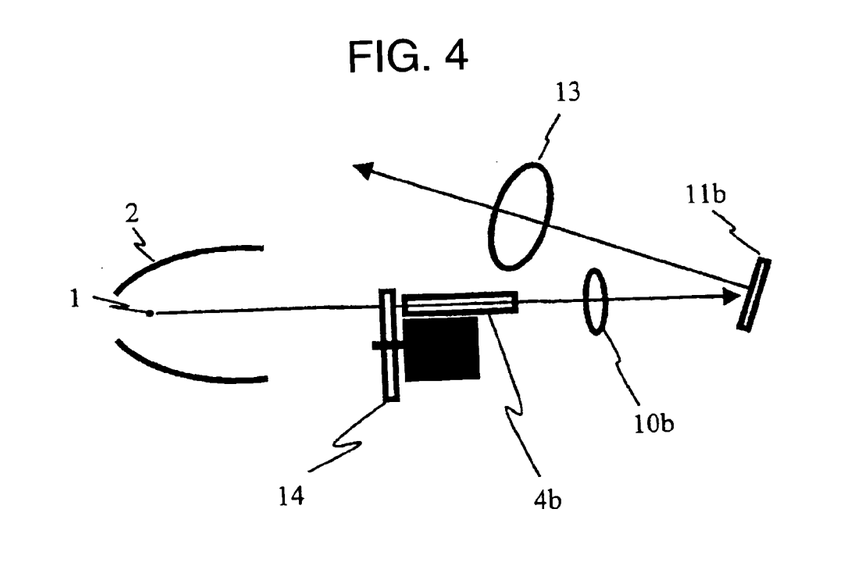
FIG. 4 illustrates the essential structure of another embodiment of the projective display of the present invention with the reflector of the present invention.
Figure 5:
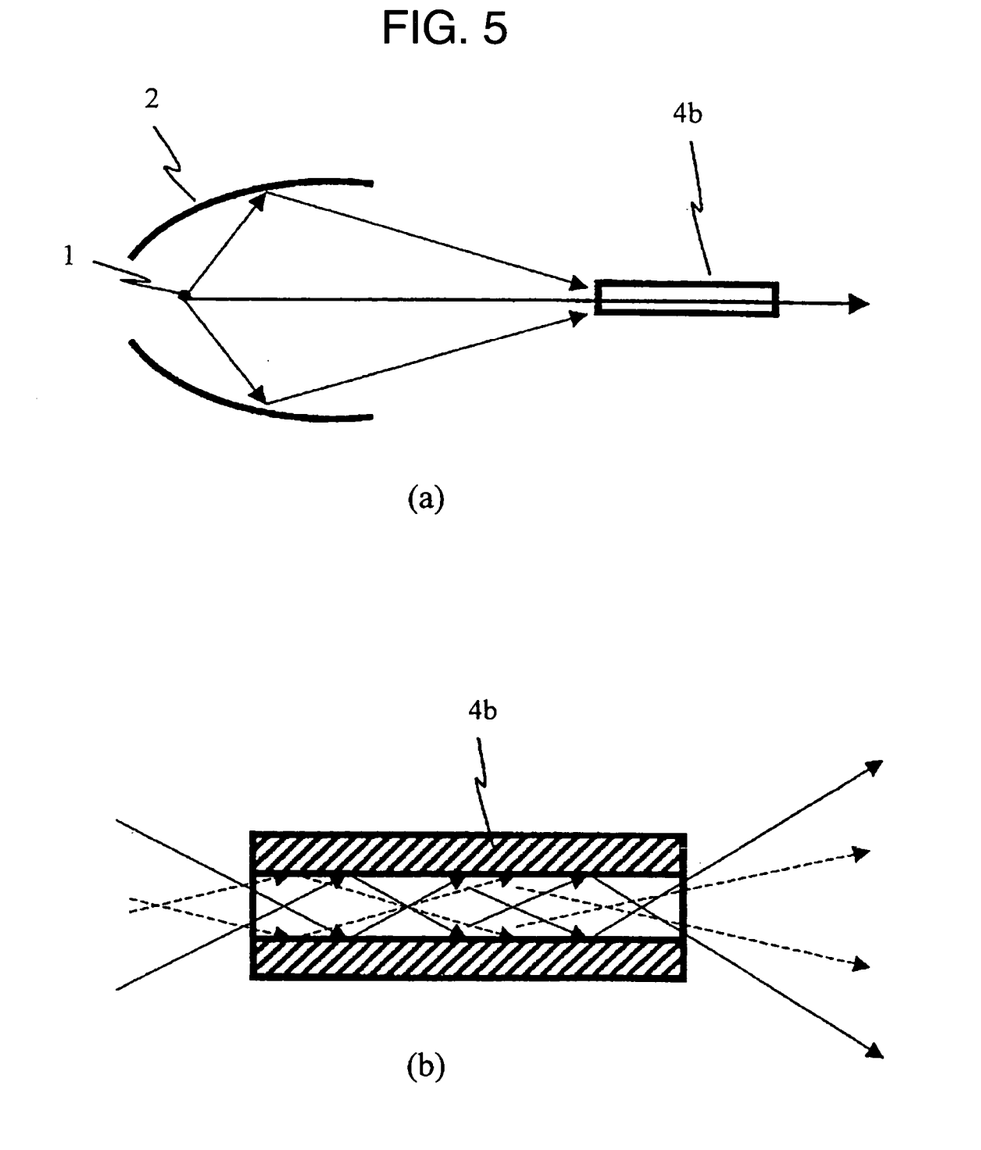
FIG. 5 illustrates how a light pipe works.
Figure 6:
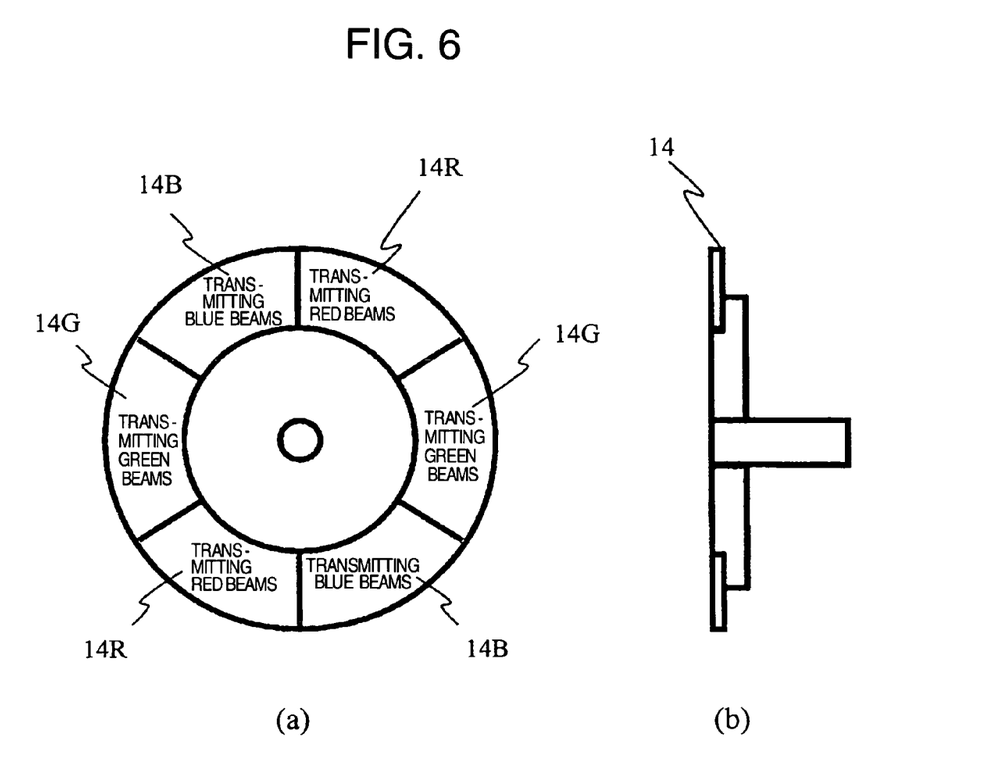
FIG. 6 illustrates how a color wheel works.

Next, the light pipe and color wheel constituting an integrator, for which the heat-resistant glass material for the present invention is used, and another embodiment of the projective display which uses the light pipe and color wheel are described by referring to FIGS. 4 to 6. FIG. 4 illustrates the essential structure of another embodiment of the projective display of the present invention. FIG. 5 illustrates how a light pipe works, and FIG. 6 how a color wheel works, (a) for front view and (b) for cross-sectional view.

The projective display of this embodiment comprises, as illustrated in FIG. 4, comprises the light source 1, reflector 2, light pipe 4b, color wheel 14, relay lens 10b, light valve 11 and projective lens 13. The light pipe 14 has a hollow structure, made of glass which is composed of $SiO_2$ as the major ingredient and at least one rare-earth element selected from the group consisting of Sc, Y, La, Pr, Nd, Pm, Sm, Eu, Gd, Tb, Dy, Ho, Er, Tm, Yb and Lu. The color wheel 14 is made of glass which is composed of $SiO_2$ as the major ingredient and at least one rare-earth element selected from the group consisting of Sc, Y, La, Pr, Nd, Pm, Sm, Eu, Gd, Tb, Dy, Ho, Er, Tm, Yb and Lu, where 2 sets of the dichromic mirrors 14R, 14G and 14B for respective red, green and blue beams are arranged in a ring (refer to FIG. 6). The reflector 2 in this embodiment has an elliptic cross-section.

The light beams emitted from the light source 1 positioned at the first focus of the elliptic reflector 2 are collected by the reflector 2 at the second focus, as illustrated in FIG. 5(a). The incident surface of the light pipe 4b as an integrator is positioned in the vicinity of the light-collected point. The beams are repeatedly reflected by the internal surface of the light pipe 4b, as illustrated in FIG. 5(b), to have improved light intensity distribution evenness. As a result, they leave the light pipe 4b with an even light intensity distribution. The light intensity distribution of the beams leaving the light pipe 4b is mapped by the relay lens 10b on the light valve 11b surface. Image information optically modulated by the light valve 11b is projected by the projective lens 13 onto a screen or the like.

The light valve 11b in this embodiment is a reflective one of micro-mirror device type with each minute mirror corresponding to a pixel rotating in an on-off manner. Illumination beam of light entering the light valve 11b at a given angle are reflected almost at a right angle to the effective surface of the light valve 11b in an "on" position to enter the projective lens 13.

The similar effect can be produced when beams are reflected by a parabolic reflector instead of elliptic reflector and collected by a convex lens. The light pipe 4b may be of solid type (the so-called rod lens type) instead of hollow type. The color wheel 14 of the above structure with 2 sets of the dichromic mirrors for red, green and blue beams arranged in a ring may be replaced by another structure, e.g., one with a dichromic mirror for white light, or another one which allows light reflected thereby to be utilized.

The glass material for the present invention is used for the optical members positioned in the vicinity of the light source 1 or beam-collected point in the above embodiments. The glass material for the present invention brings particularly notable effects when applied to these members, which are exposed to high temperature. It is however essential to apply the glass material for the present invention to other members, in order to further decrease projective display size.

For example, the glass material for the present invention, comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu, can be used as a multi-lens array, a glass material for a substrate of polarized light converters, dichroic mirrors, lens beads, UV protection filters, IR protection filters, a glass material for a substrate of phase difference plates, cross prisms, a glass material for a substrate of optical components such as front plates, and so on. Use of these optical components thus prepared is effective for decreasing size and weight of the projective display.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reflector comprising:
a main body holding a light source therein;
and a reflective layer provided on an internal surface of the main body,
wherein the main body is made of a glass comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu,
the glass has a thermal expansion coefficient lower than $40 \times 10^{-7}/°C$. and a transition temperature higher than 500° C., and
wherein the glass comprises Li and Na and a ratio of $Li_2O/Na_2O$ is 0.3 to 7.0.

2. The reflector according to claim 1, wherein
the glass contains the rare-earth element at 5 to 20% by weight as $Ln_2O_3$ (Ln: rare-earth element).

3. The reflector according to claim 1, wherein
the glass contains at least $SiO_2$ at 50 to 75%, $B_2O_3$ at 5 to 15%, $Al_2O_3$ at 10 to 25%, $R_2O$ (R: alkali metal) at 0 to 5% and ReO (Re: alkaline earth metal) at 0 to 10%, all percents by weight.

4. A reflector comprising:
a main body holding a light source therein; and
a reflective layer provided on an internal surface of the main body, wherein
the main body is made of a glass comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu,
the glass contains the rare-earth element at 1 to 30% by weight as $Ln_2O_3$ (Ln: rare-earth element),
wherein the glass comprises Li and Na and a ratio of $Li_2O/Na_2O$ is 0.3 to 7.0.

5. The reflector according to claim 4, wherein
the glass contains at least $SiO_2$ at 45 to 75%, $B_2O_3$ at 0 to 20%, $Al_2O_3$ at 0 to 30%, $R_2O$ (R: alkali metal) at 0 to 10% and ReO (Re: alkaline earth metal) at 0 to 15%, all per cents by weight.

6. The reflector according to claim 5, wherein the glass has a thermal expansion coefficient lower than $35 \times 10^{-7}/°C$.

7. The reflector according to claim 5, wherein the glass has a transition temperature higher than 600° C.

8. A projective display comprising: a light source;
a reflector reflecting a light, which is emitted from the light source, to produce illumination beam of light traveling along a light axis;
a light valve modulating the illumination beam of light; and
a projective lens projecting an image light modulated by the light valve,
wherein the reflector is made of a glass comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu, and
wherein the glass comprises Li and Na and a ratio of $Li_2O/Na_2O$ is 0.3 to 7.0.

9. The projective display according to claim 8, wherein the glass contains the rare-earth element at 5 to 20% as $Ln_2O_3$ (Ln: rare-earth element), $SiO_2$ at 45 to 75%, $B_2O_3$ at 0 to 20%, $Al_2O_3$ at 0 to 30%, $R_2O$ (R: alkali metal) at 0 to 10% and ReO (Re: alkaline earth metal) at 0 to 15%, all per cents by weight.

10. The projective display according to claim 8, wherein the glass has a thermal expansion coefficient lower than $35 \times 10^{-7}/°C$. and a transition temperature higher than 600° C.

11. A projector comprising:
a reflector converting a light, which is emitted from a light source, into illumination beam of light;
a front plate positioned in front of the reflector; and
a light source provided in a space formed by the reflector and the front plate,
wherein the front plate is made of a glass comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu, and
wherein the glass comprises Li and Na and a ratio of $Li_2O/Na_2O$ is 0.3 to 7.0.

12. The projector according to claim 11, wherein
the reflector is made of a glass comprising $SiO_2$ as a major ingredient and at least one rare-earth element selected from the group consisting of Sc, Y, La, Pr, Nd, Pm, Sm, Eu, Gd, Tb, Dy, Ho, Er, Tm, Yb and Lu.

* * * * *